United States Patent [19]

Lester et al.

[11] 4,276,207

[45] Jun. 30, 1981

[54] PIGMENT AGGLOMERATE COLORING SYSTEM

[75] Inventors: David Lester, Arlington; Robert Alexander, Waltham, both of Mass.

[73] Assignee: Polymerics, Inc., Waltham, Mass.

[21] Appl. No.: 66,618

[22] Filed: Aug. 14, 1979

[51] Int. Cl.³ .............................. C08L 1/28; C08L 3/02
[52] U.S. Cl. .................................. 260/17 R; 106/169; 106/186; 106/193 R; 106/214; 260/17.4 ST
[58] Field of Search ................ 106/214; 260/17.4 ST, 260/17 R

[56] References Cited

U.S. PATENT DOCUMENTS

| 2,822,281 | 2/1958 | Masley | 106/214 |
| 3,156,574 | 10/1964 | Gomm et al. | 106/214 |
| 4,127,422 | 11/1978 | Guzi et al. | 260/17.4 ST |

OTHER PUBLICATIONS

Chem. Absts. vol. 82: 100218p, Pigments having resistance to chemicals, Kuwahara.

Primary Examiner—Edward M. Woodberry

[57] ABSTRACT

A coloring system for temporarily or permanently dyeing fibers uses polyhydric alcohols to soften starch and cellulose derivatives in an organic acid solution to form glycolate modofied derivatives. Hydrophobic pigment particles are mixed with the glycolate modified derivatives after reducing the acidity of the solution with a base, resulting in a water removable temporary dye system that may be converted into a permanent dye by adding a latex suspension.

42 Claims, 3 Drawing Figures

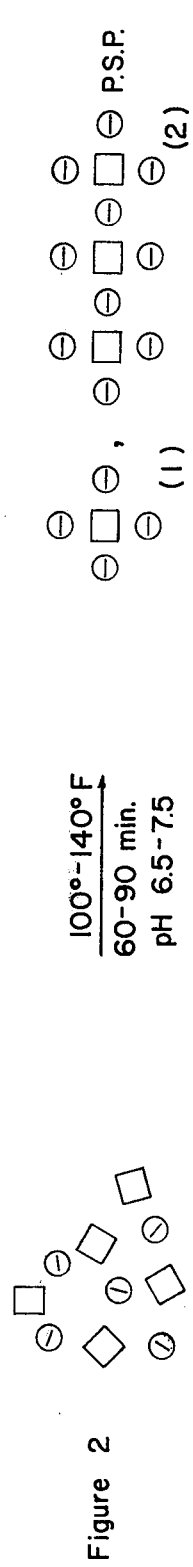
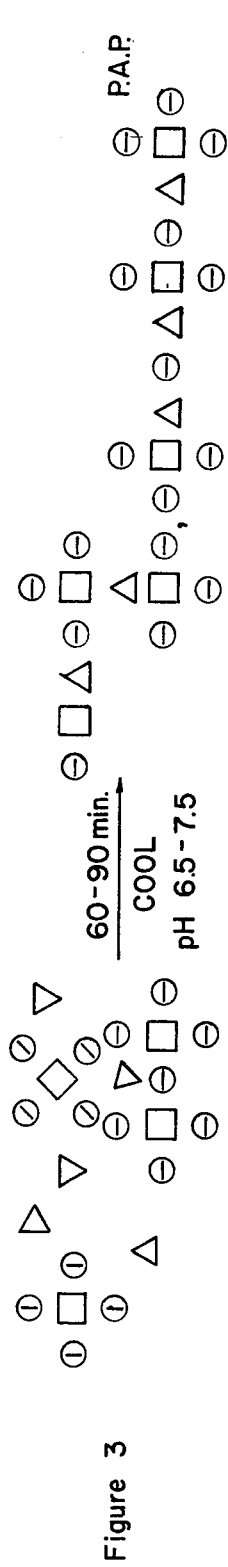
Figure 1
Figure 2
Figure 3
Legend
○ = Hydrophilic colloidal molecules or particles
□ = Hydrophobic colloidal molecules or particles
△ = Lyophilic colloidal molecules or particles
(-) = Hydrophilic non-colloidal molecules or particles

PIGMENT AGGLOMERATE COLORING SYSTEM

BACKGROUND OF THE INVENTION

1. Field of the Invention

This invention pertains to a pigment micro-agglomerate coloring system for the application of colors to textile materials for temporary or permanent coloring thereof. It is especially useful for textile materials made from synthetic fibers. Certain starch and cellulosic derivatives are softened with poly hydric alcohols to form glycolate modified derivatives which are then combined colloidally with pigment particles to form pigment sensitized particles having the pigment encapsulated therein. If a fugitive coloring is desired, the pigment sensitized particles are applied directly to the material. For permanent coloring the pigment sensitized particles are agglomerated with lyophilic colloidal binder molecules to form pigment micro-agglomerate particles which may be applied to the textile materials.

2. Description of the Prior Art

This invention pertains to a novel system of applying colors to synthetic textile materials and to a novel means of removing the color completely without staining the synthetic fibers. The term "textile materials" is meant to include fabrics or materials composed of threads and yarns, woven and knitted goods, resin bonded fibers and fibrous sheet materials.

In recent years, the art of applying pigment colors to textile materials, either by printing from engraved rolls, or overall printing with smooth rubber or metal rolls, on the surface of the material and affixing the colors thereon by the select use of bonding agents, has become more highly developed and widespread. For successful coloring this way, it is necessary to thicken the coloring solution by the use of thickeners such as gum tragacanth, gum arabic, poly acrylic acid or cellulosic derivatives. For example, in coloring with pigments in an aqueous medium, it is necessary to prepare a pigment dispersion using surface active chemicals. The pigment dispersion is mixed with a binder resin, usually an elastomeric latex, and a thickener to give the coloring mix suitable consistency or body to permit application of the coloring mix from engraved printing rollers or smooth pad rolls.

These prior art coloring systems are characterized by the use of substantial quantities of relatively expensive ingredients which have the sole function of thickening the coloring mix for ease of application. These thickening agents are strongly hydrophilic colloids that interact with water or solubilize in water to raise the viscosity of the water. Furthermore, they are stiff and firm in hand and impart this stiffness and firmness to the textile goods. To soften the goods, these thickening agents must be washed out, adding a further expense.

The present invention pertains to pigment coloring mixes which have the required viscosity, are softer in hand and need not be after washed. These pigment mixes may include a binder for permanent adhesion to the textile material or may omit the binder, thereby providing only temporary adhesion to the textile material. Since the invention includes a means to encapsulate the pigment, the temporary pigment mixes may be removed without staining the fibers of the textile material. This temporary or fugitive coloring is not possible with prior art systems.

SUMMARY OF THE INVENTION

This invention pertains to pigment micro-agglomerate coloring systems for coloring synthetic fibers and textile materials, either permanently or temporarily. In the invention certain starch and celluosic derivatives are softened with poly hydric alcohols to form glycolate modified derivatives (GMD). The GMD's serve as the thickener to form a pigment-GMD agglomerate which is then colloidally combined to form a complex pigment-GMD-binder agglomerate. This pigment micro-agglomerate coloring complex is deposited on the textile goods from print rollers or pad rolls to yield a coloring system which is soft and durable, and which has a better wet crock performance than prior art systems.

The pigment micro-agglomerate complex of the present invention is made in a series of steps, the first of which is the modification step. In this step non-colloidal hydrophilic molecules of poly hydric compounds, such as glycerin, 1,3 butylene glycol, 1,2 butylene glycol and 1,2 propylene glycol, are solvated into hydrophilic colloidal molecules such as acetylated starches and hydroxy ethyl celluloses. After heating in an acidic solution (pH of 4–6), the resultant particles are glycolate modified derivatives (GMD).

In the second step, the GMD are combined colloidally with pigment particles to form pigment sensitized particles (PSP) in which the pigment is encapsulated within the GMD.

In the third step, the PSP are agglomerated with lyophilic colloidol binder molecules to form the pigment agglomerate particles (PAP). The PAP is still very hydrophilic, complexing many water molecules such that a thickening action still prevails of the required viscosity for effective application by means of print rolls or pad rolls to textile materials. The resultant PAP, when deposited on the surface of textile materials, will be firmly affixed by the function of the binder which "cements" the pigment micro-agglomerate complex in place. The glycolate modified derivative, GMD, as part of this complex, is also affixed. Since the GMD is soft, it contributes to providing good properties of color yield, comfort, hand and wet crock.

The formation of soft, flexible starch and cellulose derivatives as thickeners is crucial to the invention. These glycolate modified derivatives are made by the acid reaction of low molecular weight glycols with starch or cellulosic derivatives. The mechanism of reaction is the formation of hydrocellulose by the hydrolysis attack of the acid of the 1,4 ether linkage of the cellulose or starch chain. Either hydroxy ethyl cellulose or acetylated starch are reacted with glycerine, 1,3 propylene glycol, 1,4 butylene glycol or 1,3 butylene glycol at an acid pH. After reaction, the starch or cellulose derivatives give films that are clear and flexible. The derivatives are first hydrolyzed and then cross-linked with the glycols to form glycolates. Different glycols may be used as long as there are two hydroxy groups in terminal reactive positions and the molecular weight is low enough to preserve solubility in water.

Pigment is then added to the GMD solution, the pH is adjusted to 6.5 to 7.5, the temperature is raised to 120°–140° F. for 60 to 90 minutes while the mixture is agitated. The GMD migrates and encapsulates colloidally the pigment particles, while the viscosity becomes lower. The pigment is completely encapsulated, thus providing a solution of pigment sensitized particles, PSP. The PSP may be used to color temporarily a textile material or synthetic fiber when dried. The PSP are completely redispersible with water upon subsequent rewetting.

A pigment micro-agglomerate for permanent coloring is formed by adding a latex binder to the PSP solution. Usually the latex is a film forming elastomer, but it can be any polymeric composition that is in a latex or collodial dispersion. After mild agitation, the pigment agglomerate particles (PAP) are formed. The efficiency of intermixing is intermolecular, such that secondary valence forces are holding the particles intermolecularly together. The glycolate derivatives, pigment colors and binders cannot be separately extracted from one another. Upon application of this coloring system to textile materials, driving off the water and heat curing to further adhesion, the color is durable, fast to washing and dry cleaning, has good wet and dry crock resistance, has a soft and supple hand and improved color rub off. The result is primarily due to the flexible nature of the glycolate derivatives.

BRIEF DESCRIPTION OF THE DRAWINGS

FIG. 1 is a diagrammatic representation of the formation of a glycolate modified derivative.

FIG. 2 is a diagrammatic representation of the formation of a pigment sensitized particle.

FIG. 3 is a diagrammatic representation of the formation of a pigment micro-agglomerate complex.

DESCRIPTION OF THE PREFERRED EMBODIMENT

This invention pertains to pigment micro-agglomerate coloring systems for coloring synthetic fibers and textile materials, either permanently or temporarily. In the invention certain starch and cellulosic derivatives are softened with poly hydric alcohols to form glycolate modified derivatives (GMD). The GMD's serve as thickener which encapsulates pigment particles to form a pigment-GMD agglomerate which in itself can be used for the temporary coloring of synthetic textile materials. The pigment-GMD agglomerate may be colloidally combined with a latex binder to form a complex pigment-GMD-binder agglomerate. This pigment micro-agglomerate complex may be deposited on textile materials from print rolls or pad rolls to yield a coloring system which is soft, durable and fast to washing and dry cleaning.

Referring now to the drawings, the three figures illustrate in a diagrammatic way the steps in the formation of the pigment micro-agglomerate complex of the present invention. FIG. 1 illustrates the first or modification step. Non-colloidial, hydrophilic molecules of poly hydric compounds, such as glycerin, 1,3 butylene glycol, 1,4 butylene glycol and 1,2 propylene glycol are solvated into hydrophilic colloidal molecules or particles by heating the components for 60 to 90 minues between 100° and 140° F. with an acid added to maintain a pH between 4 and 6. The resultant particles are permanently modified and are called glycolate modified derivatives, GMD.

The next step is the pigment sensitization step, as illustrated in FIG. 2. The glycolate modified derivatives are combined colloidally with pigment particles by heating between 100°–140° F. for 60 to 90 minutes maintaining a pH of 6.5 to 7.5. The resultant pigment sensitive particles, PSP, may be used for temporary coloring, as described hereinafter.

The third step is the pigment agglomeration step, as illustrated in FIG. 3. In this step the PSP are agglomerated with lyophilic colloidal molecules or particles by mixing under mild agitation for 60 to 90 minutes while maintaining a pH of 6.5 to 7.5. The resulting pigment agglomerate particles, PAP, are very hydrophilic, complexing numerous water molecules, such that a thickening action still prevails of the required viscosity for effective application by print rolls or pad rolls to textile materials. This resultant PAP, when deposited on the surface of the textile materials will be firmly affixed by the function of the binder which bonds the whole complex in place. The glycolate modified derivative, GMD, as part of this complex is also affixed, and is soft, and contributes to providing good properties of color yield, comfort, hand, and wet crock.

The inventon includes a very effective means to form soft, flexible starch and cellulose derivatives. The ability to make these soft, thickener type derivatives is crucial to this invention. The glycolate modified derivatives, as we have termed them, are made by the acid reaction of low molecular weight glycols with starch or cellulosic derivatives. The starch or cellulosic derivatives are reacted under acid conditions with the glycols. We believe the mechanism of reaction to be the formation of hydrocellulose by the hydrolysis attack of the acid of the 1,4 ether linkage of the cellulose and starch chains, of course cellulose chains being composed of beta-glucose molecules, and starch of alpha-glucose molecules. The beta-glucose molecules of cellulose we can represent by $R_B$ and the alpha glucose molecules of starch as $R_s$. Therefore, the structured formula for cellulose and starch can be represented as such:

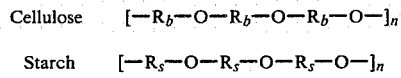

Cellulose $[-R_b-O-R_b-O-R_b-O-]_n$

Starch $[-R_s-O-R_s-O-R_s-O-]_n$

We must understand that the $R_B$ unit of cellulose—

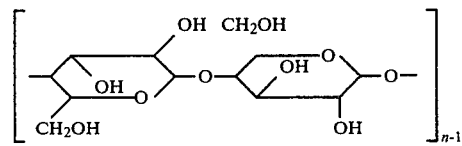

can form various derivatives with the available hydroxy groups being reacted. The same for the $R_s$ unit of starch—

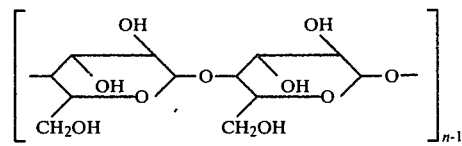

hence, in this specification, we will represent the various derivatives as they are reacted with the available hydroxyl groups. For hydroxy ethyl cellulose, we have

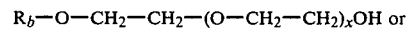

$R_b-O-CH_2-CH_2-(O-CH_2-CH_2)_xOH$ or

-continued

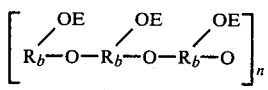

For acetylated starch, we have—

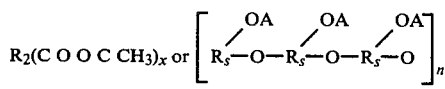

In the making of the glycolate modified derivative—GMD, hydroxy ethyl cellulose and acetylated starch are reacted with glycerine, 1,3 propylene glycol, 1,4 butylene glycol, or 1,3 butylene glycol. The reaction is carried out at an acid pH. For hydroxy ethyl cellulose and 1,3 propylene glycol—

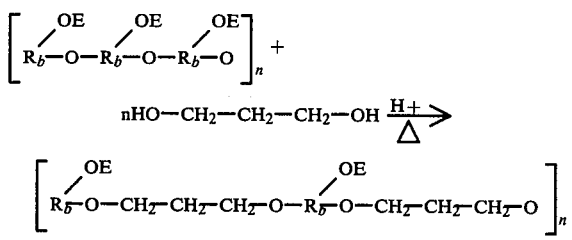

For acetylated starch and 1,3 propylene glycol—

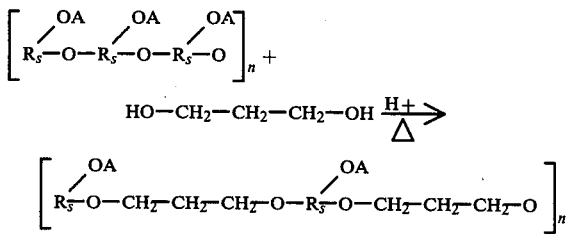

The essential result of the above reactions is that the unmodified hydroxy ethyl cellulose, and acetylated starch derivatives give films that are clear, but brittle and stiff. After reaction or modification with the propylene glycol, they give films that are clear, but flexible, not brittle.

The reacton conditions are to dissolve the hydroxy ethyl cellulose, or acetylated starch, in water at a concentration of anywhere from 0.05-20%, add formic acid to adjust the pH to 4-5, add the 1,3 propylene glycol at a concentration of 0.01-10%, and react at a temperature of 160°-180° for 30-90 minutes. As the reaction proceeds, a definite change can be noted. At first, the viscosity of the reacting solution will drop, and become increasingly clear, but then begins to increase and take on a haze. We theorize that the derivatives are first hydrolzed, and then crosslinked with the glycols to form glycolates. The kinds of products that can be made are numerous, by varying the reaction conditions and the reactants. Many different acids besides formic can be used, such as acetic, oxalic, tartaric, citric, i.e., the organic acids, not the mineral acids. Different glycols besides propylene glycol can be used such as glycerin, 1,2 and, 1,4 butylene glycol, dihydroxy acetone and others, as long as there are two hydroxy groups in terminal reactive positions, and the molecular weight is not to high to lose solubility in water.

After the formation of the glycolate modified derivative, GMD, the next step is pigment sensitization. The pigment color is added to the GMD solution, at a concentration of 0.25-15% dependent on the depth of shade required, and the corresponding concentration of the GMD. The pH is adjusted with ammonia to 6.5-7.5. The temperature is brought to 120°-140° F., and the solution is held under mild agitation for 60 to 90 minutes. The GMD will migrate and encapsulate, colloidally, the pigment particles. The viscosity of the solution will adjust at this point, becoming lower. The pigment is completely encapsulated, and we refer to this as sensitizing the pigment particles. Interestingly enough, if pigment sensitized particles, PSP's in solution form, colloidally suspended, are cast onto a surface and dried, they are completely redispersible with water upon subsequent rewetting. In fact, the cleanup, either off the hands or off various surfaces, is easy and total. This property illustrates the complete encapsulation of the pigment, and this feature can be utilized to good purpose when it is desired to only temporarily color a substance, and then be able to remove said coloring without staining. The GMD's of this invention are uniquely capable of sensitizing pigment particles, or encapsulating them. This action will work equally well on non-colored pigments or fillers as they are called. In fact, sensitized filler particles are easily incorporated into foam systems, so that they do not destabilize the foam, and in foam printing or coating, it is a distinct advantage to incorporate a high level of filler.

After the sensitizing step, the next step is to form what we term the pigment agglomerate. To the PSP solution, as made above, we now add binder which is in latex form. The binder is usually a film forming elastomer, and can be of any composition. This does not matter, nor does it restrict or confine the workings of this invention. What is important is that the polymeric binder be a latex or colloidal dispersion. This is added to a concentration of 0.25-20%, and held at room ambient temperature, under mild agitation for 60-120 minutes. After awhile, it is apparent that the colloidal nature of the solution or mix has changed. The viscosity drops even lower, and a clear layer of liquid will form at the top of mix when agitation is stopped and the suspended particles begin to show signs of settling. This is typical of the situation of forming a larger agglomerate particle. Instead of being in the particle size range of less than one micron, the particles now, if examined under a microscope and measured, are in the particle size range of 1 to 8 microns, more normally around 2-3 microns. The sensitized pigment-binder agglomerate is now formed. The pigment agglomerate particles, PAP, so formed, are now very intimately admixed in a very unique and permanent manner. The efficiency of intermixing is intermolecular, such that secondary valence forces are holding the particles intermolecularly together, and much more effectively, or efficiently than could be accomplished by simple dispersion mixing. In this agglomerate form the glycolate derivatives, the pigment colors and the binders are so tightly bound up intermolecularly together, that they cannot now be separately extracted fron one another. Upon subsequent application of this coloring system to textile substrates, and driving off the water, and heat curing to further adhesion, the system is very durable, and fast to washing and drycleaning. Surprisingly, even the wet and dry crock resistance, or rub off of color, is markedly improved, and what is so important, the hand is soft and supple, due to the flexible nature of the glycolate derivatives, as opposed to other thickeners that are non-flexible and brittle.

The following examples are given to illustrate this invention further:

EXAMPLE I

Paint Color

| I Making the GMD Formula INGREDIENTS | PARTS BY WEIGHT |
| --- | --- |
| 1. Water | 1020 |
| 2. Kofilm 80,90% | 100 - acetylated starch |
| 3. Formic Acid, 90% | 4 |
| 4. Diethylene Glycol | 20 |

The Kofilm 80 is an acetylated starch made by National Starch Company, Plainfield, N.J., which is dissolved in the water first by adding it slowly to the water, cold, under adequate agitation until completely dispersed. Formic acid is added, followed by the diethylene glycol. The pH is checked to make certain it is in the range of 4–5. The temperature is gradually raised to 180° F., and held at this temperature, under mild agitation, for 90 minutes. The heat is removed, and the batch is allowed to drop in temperature to 120° F. The viscosity of the solution prior to the cook was 25,000 cps.; after the cook 18,000 cps.

| II Making the PSP Formula Ingredients | Parts By Weight |
| --- | --- |
| 1. GMD Solution, 10% | 1144 |
| 2. Cu Phythocayamine Blue Dispersion, 40% | 55 |
| 3. Ammonia | to pH 6.5 |

The blue pigment concentrate is added to the GMD solution, and then the solution adjusted with ammonia to a pH of 6.5. The temperature of the solution is held at 120° F. for 60 minutes under mild agitation. The temperature is allowed to drop to ambient room temperature. The viscosity of the PSP solution as made is 9,000 cps.

| III Making the PAP. Formula Ingredients | Parts by Weight |
| --- | --- |
| 1. PSP Solution, 11% | 1199 |
| 2. Hycar 1561, 40% | 100 - nitryl rubber |

The above solution is held at ambient temperatures. The Hycar 1561 is an elastomeric copolymer composed of about 55% butadiene, and 45% acrylonitrile, in the form of a latex, made by B. F. Goodrich Company, Akron, Ohio. The above solution is mildly agitated for 120 minutes, at which time distinct 3–8 micron agglomerate particles have formed.

| IV. Print Formula Ingredients | Parts by Weight |
| --- | --- |
| 1. PAP Solution, 13% | 1299 |

-continued

| IV. Print Formula Ingredients | Parts by Weight |
| --- | --- |
| 2. Carbopol K-934-5% solution | 1 |
| 3. Triton X100 | 1 |
| 4. Dodecyl alcohol | .5 |
| 5. Defoamer | .2 |

Additional chemicals are added to form the final print mix. The Carbopol K-934 is a thickener which is a copolymer of acrylic acid and acrylonitrile, made by B. F. Goodrich Company, added to adjust the print mix to a viscosity of 20,000 cps. The Triton X-100 is a nonionic wetting agent which is a condensation product of nonophenol and ethylene oxide, made by Rohm and Haas Company, Philadelphia, Pa., which is added to provide better print mix penetration and wetting of the textile goods. Do decyl alcohol is added to give smoothness, and further wetting. A defoamer is added to control or prevent foaming during printing.

EXAMPLE II

Pigment Pad Color

| I. Making the GMD Formula Ingredients | Parts by Weight |
| --- | --- |
| 1. Water | 1000 |
| 2. Kofilm 80,90% | 50 - acetylated starch |
| 3. Formic Acid, 90% | 4 |
| 4. Diethylene glycol | 10 |

The above is cooked at 160° F. for 70 minutes, under mild agitation. The viscosity of this GMD solution is 2800 cps.

| II. Making the PSP Formula Ingredients | Parts by Weight |
| --- | --- |
| 1. GMD solution, 5.5% | 1064 |
| 2. Cu Phthocyanine Blue Dispersion 40% | 37 |
| 3. Ammonia | to pH 7.0 |

This solution is cooked for 40 minutes at 135° F. under mild agitation then dropped to ambient temperatures.

| III. Making the PAP Formula Ingredients | Parts by Weight |
| --- | --- |
| 1. PSP Solution, 6.7% | 1100 |
| 2. Hycar 2679, 50% | 50 - polyacrylic polymer |
| 3. Hycar 1561, 40% | 12.5 - nitryl rubber |

The above solution is held at room temperature, under mild agitation, for 120° F. minutes, after which time a distinct 3–8 micron agglomerate particles form. After this time interval, the pad dye solution is prepared as follows:

| IV. Pad Dye Formula Ingredients | Parts by Weight |
| --- | --- |
| 1. PAP solution 9% | 1160 |
| 2. Triton X100 | 0.5 |

-continued

| IV. Pad Dye Formula Ingredients | Parts by Weight |
|---|---|
| 3. Methocel, 15 cps. | 0.9 |
| 4. Cymel 303, 80% (MF resin) | 1.2 - butylated melamine resin |
| 5. Defoamer | 0.3 |

This pad dye solution has a viscosity of 700–900 cps.

EXAMPLE III

Print Color

The GMD solution is made the same as Example I, and so also the PSP solution. The pigment agglomerate particles were made as follows:

| PAP Solution FORMULA Ingredients | Parts by Weight |
|---|---|
| 1. PSP Solution of Ex. 1 | 1000 |
| 2. Rhoplex HA-8, 46% | 32 - polyacrylic resin |
| 3. Hycar 1561, 40% | 37 - nitryl rubber |

This solution is held at ambient temperatures, under mild agitation, for 120 minutes. Rhoplex HA-8 is a self crosslinking polyethyl acrylate polymer in latex form from the Rohm & Haas Company, Philadelphia, Pa. After the pigment agglomerate particles have formed, at from 3–10 microns, in size, the following print formula is made.

| Print Formula Ingredients | Parts by Weight |
|---|---|
| 1. Above PAP Solution, 13% | 1000 |
| 2. Alcogum L-11, 30% | 1 - polyacrylic acid |
| 3. Butylated Melamine-formaldehyde resin 50% | 3 |
| 4. Defoamer | 0.4 |

The viscosity of the print paste is 18,000 cps. This formula is particularly good on rayon or cotton goods.

EXAMPLE IV

Pigment Pad Color

The GMD and PSP solutions are made the same as Example II. The PAP solution is made as follows:

| PAP Solution Formula Ingredients | Parts by Weight |
|---|---|
| 1. PSP Solution of Ex. 2 | 1000 |
| 2. Darex 410, 46% | 47 - polyacrylic resin |
| 3. Hycar 1561, 40% | 10 - nitryl rubber |

This is stirred at room temperature for 100 minutes, after which time the desired pigment agglomerate particles are formed at a particle size range of 2–8 microns. From this is made the following pigment pad formula.

| Pad Dye Formula Ingredients | Parts by Weight |
|---|---|
| 1. PAP solution from above 8.7% | 1000 |
| 2. Methocel, 4000 cps. | 0.9 |

| Pad Dye Formula Ingredients | Parts by Weight |
|---|---|
| 3. Keltex | 0.45 - protein gum |
| 4. Urea | 0.4 |
| 5. Ammonium hydroxide, 28% | 2.7 |
| 6. Trimethyol Melamine Resin, 80% | 3.0 |
| 7. Triton X100 | 0.4 |
| 8. Ammonium Stearate, 30% | 0.12 |
| 9. Defoamer | 0.4 |

This formula had a viscosity of 600–800 cps. This pigment pad formula is particularly good on polyester/cotton goods, giving a soft hand with good wash performance.

EXAMPLE V

Print Color

| I. Making the GMD Formula Ingredients | Parts by Weight |
|---|---|
| 1. Water | 1000 |
| 2. Cellosize QP 5200H, 90% | 10 - hydroxy ethyl cellulose |
| 3. Formic Acid, 90% | 2 |
| 4. Diethylene Glycol | 4 |

The Cellosize QP5200 H, is an hydroxy ethyl cellulose made by Union Carbide Corp., New York, N.Y., which is dissolved in the water by first adding it to cold water to disperse it under adequate agitation, then adding the formic acid, followed by diethylene glycol. The temperature is gradually raised to 160° F. and held for 60 minutes under mild agitation. The heat is removed, and the batch let cool to 120° F. The viscosity of the batch prior to the cook was 50,000 cps. and after the cook 30,000 cps.

| II. Making the PSP Formula Ingredients | Parts |
|---|---|
| 1. GMD solution 1.47% | 1000 |
| 2. Calcium Phthocyanine Blue Dispersion, 40% | 50 |
| 3. Ammonium Hydroxide, 28% | to pH 6.7 |

The blue pigment dispersion is added to the GMD solution, and then this solution is adjusted with ammonia to a pH of 6.7. The temperature of the solution is held at 120° F. for 60 minutes under mild agitation. After the 60 minute interval, the temperature is dropped to room temperature. The viscosity of the PSP solution is 20,000 cps.

| III. Making the PAP Formula Ingredients | Parts by Weight |
|---|---|
| 1. PSP Solution, 3.5% | 1000 |
| 2. Hycar, 1561, 40% | 100 - nitryl rubber |

The above solution is held at room temperature, under mild agitation for 120 minutes, after which time agglomerated particles are formed range in size from 2–10 microns. This is now made up in a print formula. The solution viscosity is 12,000 cps.

IV Print Formula

| Ingredients | Parts by Weight |
|---|---|
| 1. PAP Solution, 7.5% | 1000 |
| 2. Carbopol K-934, 5% solution | 3 |
| 3. Triton X-100 | 1 |
| 4. Xylene | 1.5 |
| 5. Defoamer | 0.2 |

This print mix has a viscosity of 20,000 cps. It prints very well from engraved rolls. The resultant prints are soft, and display excellent sharpness of print definition.

EXAMPLE VI

Pigment Pad Color

I. Making the GMD Formula

| Ingredients | Parts by Weight |
|---|---|
| 1. Water | 1000 |
| 2. Cellosize QP5200H | 7 |
| 3. Formic Acid | 2 |
| 4. Diethylene Glycol | 3 |

The above is cooked for 90 minutes at 180° F., under mild agitation. The viscosity of this solution is 25,000 cps.

II. Making the PSP Formula

| Ingredients | Parts by Weight |
|---|---|
| GMD solution, 1.2% | 1000 |
| 2. CuPhthocyanine Blue Dispersion 40% | 35 |
| 3. Ammonium Hydroxide, 28% | to pH 6.7 |

This solution is cooked for 60 minutes at 160° F., under mild agitation, then dropped to room temperature. Viscosity is 17,000 cps.

III Making the PAP Formula

| Ingredients | Parts by Weight |
|---|---|
| 1. PSP Solution, 3.0% | 1000 |
| 2. Hycar 2679, 50% | 39 |
| 3. Hycar 1561, 40% | 21 |

The above solution is held at room temperature, under mild agitation, for 120 minutes. After this time interval, a distinct range of agglomerate particles from 3-8 microns form. From this is now prepared the dye solution. Viscosity 300 cps.

IV. Pad Dye Formula

| Ingredients | Parts by Weight |
|---|---|
| 1. PAP solution 5.8% | 1000 |
| 2. Triton X100 | 0.5 |
| 3. Methocel, 15 cps. | 0.9 |
| 4. Cymel 303, 80% (MF resin) | 1.9 |
| 5. Defoamer | 0.3 |

The viscosity of the pad dye solution is 700-900 cps. This pad dye solution goes on very well, with excellent color yield and uniformity, with no migration of pigment upon drying.

EXAMPLE VII

Print Color

The GMD solution is made the same as cited in Example V., and so also for the PSP solution. The PAP solution is made as follows:

PAP Solution Formula

| Ingredients | Parts by Weight |
|---|---|
| 1. PSP Solution of Ex. 5 (3.5%) | 1000 |
| 2. Darex 410, 46% | 48 |
| 3. Hycar 1561, 40% | 14 |

This solution is mildly agitated at room temperature for 120 minutes to form the pigment agglomerate particles of size of 2-8 microns. This is now made up into the following print formula.

Print Formula

| Ingredients | Parts by Weight |
|---|---|
| 1. Above PAP Solution, 6% | 1000 |
| 2. Alcogum L-11, 30% | 3 |
| 3. Butylated Melamine-formaldehyde resin, 50% | 3.0 |
| 4. Defoamer | 0.2 |

Viscosity of this print paste is 22,000 cps. This print paste gives good definition of color, and a soft feel. The color yield was excellent.

EXAMPLE VIII

Pigment Pad Color

The GMD and PSP solutions are made the same as Example VI. The PAP solution is made as follows:

PAP Formula

| Ingredients | Parts by Weight |
|---|---|
| 1. PSP solution of Ex. 6, 3.0% | 1000 |
| 2. Darex 410, 46% | 24 |
| 3. Hycar 1561, 40% | 7 |

This solution is stirred at room temperature for 120 minutes, the pigment agglomerate particles form at a size of 2-8 microns. From this is made the following pigment pad formula.

Pad Dye Formula

| Ingredients | Parts by Weight |
|---|---|
| 1. PAP solution from above, 4.5% | 1000 |
| 2. Keltex | 1.2 |
| 3. Triton X100 | 0.4 |
| 4. Ammonium Hydroxide, 28% | 2.4 |
| 5. Ammonnium Stearate, 30% | 3.0 |
| 6. Trimethylol Melamine resin, 80% | 2.4 |
| 7. Defoamer | 0.4 |

This formula had a viscosity of 400–600 cps. It padded on very well, gave a pleasing soft hand and excellent uniform coloring. The wash fastness is very good.

At this point it is important to present comparative test data of the above pigment print and padding mixes as made by this invention versus conventional pigment print and padding systems. The evaluation data is presented in the following tables:

| PRINT SYSTEMS | RATINGS | | | | | |
|---|---|---|---|---|---|---|
| | Color Yield | Wash Fastness | Dry Crock | Wet Crock | Hand | Light Fastness |
| Example I | 5 | 4 | 4 | 3–2 | 4 | 4 |
| Example III | 4 | 4 | 4 | 4–3 | 4–3 | 4 |
| Example V | 4 | 4 | 4 | 3–2 | 5–4 | 4 |

| PRINT SYSTEMS | RATINGS | | | | | |
|---|---|---|---|---|---|---|
| | Color Yield | Wash Fastness | Dry Crock | Wet Crock | Hand | Light Fastness |
| Example VII | 5 | 4 | 4 | 4–3 | 4–3 | 4 |
| Conventional 1 Phthlo Blue | 4 | 4 | 4 | 2 | 3 | 4 |
| Conventional 2 Phthlo Blue | 3–4 | 4 | 4 | 2 | 2 | 4 |

Ratings: 5-Excellent, 4-Good, 3-Mod. Good, 2-Fair, 1-Poor

From the above table it can be seen that this invention has a desirable effect on hand and color yield. The wet crock is also improved over two conventional Phthlo Blue pigment print formulas supplied to the textile industry. The washfastness and dry crock are equivalent.

| PAD DYE SYSTEMS | RATINGS | | | | | |
|---|---|---|---|---|---|---|
| | Color Yield | Wash Fastness | Dry Crock | Wet Crock | Hand | Light Fastness |
| Example II | 4 | 4 | 4 | 3 | 3–4 | 4 |
| Example IV | 3–4 | 4 | 4 | 3–4 | 3 | 4 |
| Example VI | 4 | 4 | 4 | 3 | 3–4 | 4 |
| Example VIII | 3–4 | 4 | 4 | 3–4 | 3 | 4 |
| Conventional 1 Phthlo Blue | 3–4 | 4 | 4 | 2 | 2–1 | 4 |
| Conventional 2 Phthlo Blue | 3–4 | 4 | 4 | 2 | 2–1 | 4 |

For pigment pad dyeing the examples of this invention are superior to conventional systems, the wet crock is improved, and the hand is dramatically better. The improvement in hand is very important for pigment pad dyeing, because the thickening agents that are currently used, even in very small amounts of actual deposition on the textile goods, cause stiffening. This has always been a drawback to pigment pad dyeing. Also, in conventional systems to obtain washfastness, a substantial level of binding resin has to be employed. Hence pigment pad dyeings that have good washfastness, have firm hands. By using the glycolate derivatives of this invention, and forming the pigment agglomerate with the binder, much less binder has to be used to achieve an equivalent level of washfastness, and coupled with glycolate derivative as a thickener, is softer in hand. This double effect now allows one to design pigment dye systems that are pleasing in hand and washfast.

EXAMPLE IX

The glycolate derivatives are good as foam stabilizers, so as such are useful in foam print systems.

Pigment Foam Print

| I. Making the GMD | |
|---|---|
| Formula Ingredients | Parts by Weight |
| 1. Water | 1000 |
| 2. Kofilm 80, 90% | 140 |
| 3. Formic Acid, 90% | 6 |
| 4. Citric Acid, 90% | 2 |
| 5. Diethylene glycol | 30 |

This cooked in the usual manner at 160° F. for 90 minutes, under mild agitation. The viscosity at the end of the cook is 40,000 cps.

| II. Making the PSP | |
|---|---|
| Formula Ingredients | Parts by Weight |
| 1. GMD Solution, 15% | 1000 |
| 2. ITR Red, 25% | 78 |
| 3. Ammonium Hydroxide | to pH 7.0 |

This is cooked for 60 minutes at 160° F., with mild agitation. The viscosity at the end of this cook is 30,000 cps.

| III. Making the PAP | |
|---|---|
| Formula Ingredients | Parts by Weight |
| 1. PSP solution, 15% | 1000 |
| 2. Hycar 2679, 50% | 62 |
| 3. Hycar 1561, 40% | 19 |

This solution is held at room temperature for 35 minutes, under mild agitation. The pigment agglomerate particle range in size from 1.5–4.0 microns. The viscosity of the PAP solution is 8000 cps.

| IV. Foam Print Compound | |
|---|---|
| Formula Ingredients | Parts by Weight |
| 1. PAP Solution, 15% | 2000 |
| 2. Dupanol ME, 20% | 12 - Lauryl sulfate |
| 3. Melamine Formaldehyde resin, 50% | 8 |
| 4. Ammonium Stearate, 30% | 1.5 |

The above mix can be shipped into a foam with the use of a high speed mixer to give a foam of a density of 0.43. This foam print compound is very stable, applys well with excellent pore structure and once applied yields a soft, flexible print.

EXAMPLE X

An interesting property of the pigment sensitized particle (PSP) is that the pigment is completely encapsulated by the glycolate modified derivative. This means that if the PSPs are deposited upon a textile substrate, they can later be removed completely by water. This property can be used to advantage for the making of fugitive or nonstaining tints. There are times when it is desirable to tint a kind, or lot of fiber to identify it during the processing. After the processing is complete, then it is desirable to remove the tint completely without any staining. With dyes or pigments that are selected to have no affinity to a certain kind of fiber, staining still results; and the wash procedure is quite involved to try to remove all of the dyestuff or pigment completely. However, the pigment sensitized particles (PSP) will not stain the fiber regardless of composition and will wash out completely and easily with hot water, or mild soaping, hot or cold. This property has proved most effective in creating a craft for children, permitting them to color the hair of dolls. The hair coloring of dolls was not possible with prior art dyestuffs and pigments, since they would stain the doll's hair no matter what fiber was used—polypropylene, nylon, polyester, etc. In fact, the search to find dyestuffs or pigments that would easily wash out without staining has been long and unfruitful. The PSP concept was tested and worked perfectly with a full range of colors. So the invention of micro-encapsulation of pigment particles with glycolate modified derivatives provides the development of a fugitive, non-staining hair coloring system, that can be used as a child's activity. The making of this doll hair coloring system is as follows:

I. Making the Glycolate Modified Derivative

| Formula Ingredients | Parts by Weight |
| --- | --- |
| 1. Water | 1000 |
| 2. Cellosize QP100M, 90% | 15 |
| 3. Citric Acid, 90% | 3 |
| 4. Glycerin | 20 |

This solution is cooked under mild agitation for 90 minutes at a temperature of 180° F. The viscosity of this cook is 36000 cps.

II. Making the Pigment Sensitized Particles

| Formula For Red Ingredients | Parts by Weight |
| --- | --- |
| 1. GMD Solution, above, 4% | 1000 |
| 2. Hercules Red T. Dispersion | 10 |
| 3. Ammonium Hydroxide, 20 | to pH 7.0 |

| Formula for Violet Ingredients | Parts by Weight |
| --- | --- |
| 1. GMD Solution above, 4% | 1000 |
| 2. Carbizol Violet Dispersion | 25 |
| 3. Ammonium Hydroxide, 20% | to pH 7.0 |

| Formula for Brown Ingredients | Parts by Weight |
| --- | --- |
| 1. GMD Solution, above 4% | 1000 |
| 2. Burnt umber dispersion | 30 |
| 3. Black Dispersion | 3 |
| 4. Ammonium Hydroxide, 20% | to pH 7.0 |

The above solutions are cooked under mild agitation for 60–70 minutes at a temperature of 120° F. After this cook, the viscosity of this solution drops to range from 6–9000 cps. This makes for an excellent hair coloring mix or solution. It has just the right coverage viscosity to give an excellent comb thru application or coverage. The coloring mix is allowed to dry, whereby the artificial hair, usually nylon fiber, is uniformly colored. This coloring can be very easily and completely removed by washing in warm water, or a mild, cold water soap solution. This feature is essential to the haircoloring activity for children, whereby they can change the color of the hair on the doll at will, without staining or hurting the condition of the hair fiber. The glycolate derivative has added features of being soft, and flexible with dry surface feel, and acts like a hair conditioner to add high lite, suppleness and smoothness of feel. Without the ability of the glycolate modified deriviative to act as a soft hair conditioner, and also, able to form a micro agglomerate and encapsulation of the coloring pigment, the hair coloring activity for dolls for children would not be a commercial reality.

We claim:

1. A pigment micro-agglomerate coloring system comprising:
a solution of acetylated starch in water,
an organic acid sufficient to raise the solution to a pH of from 4 to 5,
a polyhydric alcohol,
hydrophobic pigment particles, and
a base sufficient to readjust the pH of the resultant suspension to from 6.5 to 7.5.

2. A pigment micro-agglomerate coloring system comprising:
a solution of hydroxy ethyl cellulose in water,
an organic acid sufficient to raise the solution to a pH of from 4 to 5,
a polyhydric alcohol,
hydrophobic pigment particles, and
a base sufficient to readjust the pH of the solution to from 6.5 to 7.5.

3. The pigment micro-agglomerate coloring system of claims 1 or 2 further comprising a polymeric latex binder.

4. The pigment micro-agglomerate coloring system of claims 1 or 2 wherein the polyhydric alcohol is selected from the following group:
glycerine; 1,3 propylene glycol; 1,4 butylene glycol; 1,3 butylene glycol; 1,2 butylene glycol; dihydroxy acetone; and diethylene glycol.

5. The pigment micro-agglomerate coloring system of claim 3, wherein the polyhydric alcohol is selected from the following groups:
glycerine; 1,3 propylene glycol; 1,4 butylene glycol; 1,3 butylene glycol; 1,2 butylene glycol; dihydroxy acetone; and diethylene glycol.

6. The pigment micro-agglomerate coloring system of claims 1 or 2, wherein the acid comprises one or more substances from the following group:
formic acid, oxalic acid, tartaric acid, and citric acid.

7. The pigment micro-agglomerate coloring system of claim 3, wherein the acid is selected from the following group:
formic acid, oxalic acid, tartaric acid, and citric acid.

8. The pigment micro-agglomerate coloring system of claims 1 or 2, wherein the base is selected from the following group:
ammonia, and ammonium hydroxide.

9. The pigment micro-agglomerate coloring system of claim 3, wherein the base is selected from the following group:
ammonia, and ammonium hydroxide.

10. The pigment micro-agglomerate coloring system of claim 1, wherein the acid is formic acid, and wherein the polyhydric alcohol is diethylene glycol, the starch, acid and alcohol reacting to form a glycolate modified derivative.

11. The pigment micro-agglomerate coloring system of claim 10, wherein the following constituents are in the following proportions by weight:
water—1020 parts
acetylated starch, 90%—100 parts
formic acid, 90%—4 parts
diethylene glycol—20 parts.

12. The pigment micro-agglomerate coloring system of claim 11, wherein the hydrophobic pigment particles comprise a Cu Phthocyamine blue dispersion, wherein the base comprises ammonia, and wherein the following constituents are in the following proportion by weight:
glycolate modified derivative solution, 10%—1144 parts
Cu Phthocyamine blue dispersion, 40%—55 parts
ammonia—sufficient to increase the pH to 6.5,
thereby forming a pigment sensitized particle suspension.

13. The pigment micro-agglomerate coloring system of claim 12 further comprising an elastomeric copolymer latex, wherein the following constituents are in the following proportion by weight:
pigment sensitized particle suspension, 11%—1199 parts
latex, 40%—100 parts,
thereby forming a pigment agglomerated suspension.

14. The pigment micro-agglomerate coloring system of claim 13 further comprising a thickener, a non-ionic wetting agent, dodecyl alcohol and a defoamer, wherein the following constituents are in the following proportion by weight:
pigment agglomerated particle suspension, 13%—1299 parts
thickener, 5% solution—1 part
non-ionic wetting agent—1 part
dodecyl alcohol—0.5 parts
defoamer—0.2 parts.

15. The pigment agglomerate coloring system of claim 12 further comprising an elastomeric copolymer latex and a self crosslinking polyethyl acrylate polymer latex, wherein the following constituents are in the following proportion by weight:
pigment sensitized particle suspension, 11%—1000 parts
polyethyl acrylate polymer latex, 46%—32 parts
elastomeric copolymer latex, 40%—37 parts,
thereby forming a pigment agglomerate particle suspension.

16. The pigment micro-agglomerate coloring system of claim 15, further comprising polyacrylic acid, butylated melamine resin, and a defoamer, and wherein the following constituents are in the following proportion by weight:
pigment agglomerate particle suspension, 13%—1000 parts
polyacrylic acid—1 part
butylated melamine resin, 50%—3 parts
defoamer—0.4 parts.

17. The pigment micro-agglomerate coloring system of claim 10, wherein the following constituents are in the following proportion by weight:
water—1000 parts
acetylated starch, 90%—50 parts
formic acid, 90%—4 parts
diethylene glycol—10 parts.

18. The pigment micro-agglomerate coloring system of claim 17, wherein the hydrophobic pigment particles comprise a Cu Phthocyamine blue dispersion, wherein the base comprises ammonia, and wherein the following constituents are in the following proportion by weight:
glycolate modified derivative solution, 5.5%—1064 parts
Cu Phthocyamine blue dispersion, 40%—37 parts
ammonia—sufficient to increase the pH to 6.5,
thereby forming a pigment sensitized particle suspension.

19. The pigment micro-agglomerate coloring system of claim 18 further comprising an elastomeric copolymer latex and a polyacrylic polymer latex, wherein the following constituents are in the following proportion by weight:
pigment sensitized particle suspension, 6.7%—1100 parts
elastomeric copolymer latex, 40%—12.5 parts
polyacrylic polymer latex, 50%—50 parts,
thereby forming a pigment agglomerate particle suspension.

20. The pigment micro-agglomerate coloring system of claim 19 further comprising a non-ionic wetting agent, methocol, butylated melamine resin, and a defoamer, and wherein the following constituents are in the following proportion by weight:
pigment agglomerated particle suspension, 9%—1160 parts
non-ionic wetting agent—0.5 parts
methocol, 15 cps.—0.9 parts
butylated melamine resin, 80%—1.2 parts
defoamer—0.3 parts.

21. The pigment micro-agglomerate coloring system of claim 18 further comprising an elastomeric copolymer latex and a polyacrylic resin, wherein the following constituents are in the following proportion by weight:
elastomeric copolymer latex, 40%—10 parts
polyacrylic resin, 46%—47 parts,
thereby forming a pigment agglomerate particle suspension.

22. The pigment agglomerate coloring system of claim 21, further comprising methocol, a protein gel, urea, ammonium hydroxide, trimethylol melamine resin, non-ionic wetting agent, ammonium stearate, and a defoamer, and wherein the following constituents are in the following proportion by weight:
pigment agglomerated particle suspension, 8.7%—1000 parts
methocol, 4000 cps.—0.9 parts
protein gel—0.45 parts
urea—0.4 parts
ammonium hydroxide, 28%—2.7 parts
trimethylol melamine resin, 80%—3.0 parts
ammonium stearate, 30%—0.12 parts
defoamer—0.4 parts.

23. The pigment micro-agglomerate coloring system of claim 2, wherein the acid is formic acid, and wherein the polyhydric alcohol is diethylene glycol, the cellulose, acid and alcohol reacting to form a glycolate modified derivative.

24. The pigment micro-agglomerate coloring system of claim 23, wherein the following constituents are in the following proportion by weight:
water—1000 parts
cellulose, 90%—10 parts
formic acid, 90%—2 parts
diethylene glycol—4 parts.

25. The pigment micro-agglomerate coloring system of claim 24, wherein the hydrophobic pigment particles comprise a calcium phthocyanine blue dispersion, wherein the base comprises ammonium hydroxide and wherein the following constituents are in the following proportion by weight:
glycolate modified derivative solution, 1.47%—1000 parts
calcium phthocyanine blue dispersion, 40%—50 parts
ammonium hydroxide, 28% sufficient to increase pH to 6.7, thereby forming a pigment sensitized particle solution.

26. The pigment micro-agglomerate coloring system of claim 25, further comprising an elastomeric copolymer latex, wherein the following constituents are in the following proportion by weight:
pigment sensitized particle solution, 3%—1000 parts
elastomeric copolymer latex, 40%—100 parts,
thereby forming a pigment agglomerated particle suspension.

27. The pigment micro-agglomerate coloring system of claim 26, further comprising a thickener, a non-ionic wetting agent, xylene, and a defoamer, wherein the following constituents are in the following proportion by weight:
pigment agglomerated particle suspension, 7.5%—1000 parts
thickener, 5% solution—3 parts
xylene—1.5 parts
defoamer—0.2 parts.

28. The pigment micro-agglomerate coloring system of claim 25, further comprising an elastomeric copolymer latex, and a polyacrylic resin, wherein the following constituents are in the following proportion by weight:
pigment sensitized particle solution, 3.5%—1000 parts
elastomeric copolymer latex, 40%—14 parts
polyacrylic resin, 46%—48 parts,
thereby forming a pigment agglomerated particle suspension.

29. The pigment micro-agglomerate coloring system of claim 28, further comprising polyacrylic acid, butylated melamine resin, and a defoamer, wherein the following constituents are in the following proportion by weight:
pigment agglomerated particle suspension, 6%—1000 parts
polyacrylic acid, 30%—3 parts
butylated melamine resin—3 parts
defoamer—0.2 parts.

30. The pigment micro-agglomerate coloring system of claim 24, wherein the hydrophobic pigment particles comprise Cu Phthocyamine blue dispersion, wherein the base comprises ammonium hydroxide and wherein the following constituents are in the following proportion by weight:
glycolate modified derivative solution, 1.2%—1000 parts
Cu Phthocyamine blue dispersion, 40%—35 parts
ammonium hydroxide, 28%—sufficient to increase the pH to 6.7,
thereby forming a pigment sensitized particle suspension.

31. The pigment micro-agglomerate coloring system of claim 30, further comprising an elastomeric copolymer latex, and a polyacrylic polymer, and wherein the following constituents are in the following proportion by weight:
pigment sensitized particle suspension, 3%—1000 parts
polyacrylic polymer, latex, 50%—39 parts
elastomeric copolymer latex, 40%—21 parts,
thereby forming a pigment agglomerated particle suspension.

32. The pigment micro-agglomerate coloring system of claim 31, further comprising a non-ionic wetting agent, methocol, butylated melamine resin, and a defoamer, wherein the following constituents are in the following proportion by weight:
pigment agglomerated particle suspension, 5.8%—1000 parts
non-ionic wetting agent—0.5 parts
methocol, 15 cps.—0.9 parts
butylated melamine resin—1 part
defoamer—0.3 parts.

33. The pigment micro-agglomerate coloring system of claim 30, further comprising an elastomeric copolymer latex, and a polyacrylic resin, and wherein the following constituents are in the following proportion by weight:
pigment sensitized particle suspension, 3%—1000 parts
polyacrylic resin, 46%—24 parts
elastomeric copolymer latex, 40%—7 parts,
thereby forming a pigment agglomerated particle suspension.

34. The pigment micro-agglomerate coloring system of claim 33, further comprising a protein gel, a non-ionic wetting agent, ammonium hydroxide, ammonium stearate, trimethylol melamine resin, and a defoamer, wherein the following constituents are in the following proportion by weight:
pigment agglomerated particle suspension, 4.5%—1000 parts
protein gel—1.2 parts
non-ionic wetting agent—0.4 parts.

35. The pigment micro-agglomerate coloring system of claim 1, wherein the acid is a combination of formic acid and citric acid, and wherein the polyhydric alcohol is diethylene glycol, the starch, acid and alcohol reacting to form a glycolate modified derivative, and wherein the following constituents are in the following proportion by weight:
water—1000 parts
acetylated starch, 90%—140 parts
formic acid, 90%—6 parts
citric acid, 90%—2 parts
diethylene glycol—30 parts.

36. The pigment micro-agglomerate coloring system of claim 35, wherein the hydrophobic pigment particles comprise ITR red, wherein the base is ammonium hydroxide, the glycolate modified derivative, ITR red and ammonium hydroxide combining to form a pigment sensitized particle suspension, and wherein the following constituents are in the following proportion by weight:
glycolate modified derivative, 15%—1000 parts
ITR red, 25%—78 parts
ammonium hydroxide—an amount sufficient to raise the pH of the coloring system to 7.0.

37. The pigment micro-agglomerate coloring system of claim 36 further comprising an elastomeric copolymer latex and a polyacrylic polymer latex, and wherein the following constituents are in the following proportions:
- pigment sensitized particle suspension, 15%—1000 parts
- polyacrylic polymerlatex, 50%—62 parts
- elastomeric copolymeric latex, 40%—19 parts, thereby forming a pigment agglomerated particle suspension.

38. The pigment micro-agglomerate coloring system of claim 37, further comprising, laural sulphate, melamine formaldehyde resin, and ammonium stearate, wherein the following constituents are in the following proportion by weight:
- pigment agglomerated particle suspension, 15%—2000 parts
- laural, sulphate, 20%—12 parts
- melamine formaldehyde resin, 50%—8 parts
- ammonium stearate, 30%—5 parts.

39. The pigment micro-agglomerate coloring system of claim 2, wherein the acid is citric acid, wherein the polyhydric alcohol is glycerine, the cellulose, acid and glycerin reacting to form a glycolate modified derivative, and the following constituents are in the following proportion by weight:
- water—1000 parts
- hydroxyethyl cellulose, 90%—15 parts
- citric acid, 90%—3 parts
- glycerine—20 parts.

40. The pigment micro-agglomerate coloring system of claim 39, wherein the hydrophobic pigment particles are a Hercules Red T Dispersion, wherein the base is ammonium hydroxide and wherein the following constituents are in the following proportion by weight:
- glycolate modified derivative, 4%—1000 parts
- Hercules Red T Dispersion—10 parts
- ammonium hydroxide, 20%—an amount sufficient to raise the pH of the coloring system to a pH of 7.0.

41. The pigment micro-agglomerate of claim 39, wherein the hydrophobic pigment particles are a carbizol violet dispersion, wherein the base is ammonium hydroxide, and wherein the following constituents are in the following proportion by weight:
- glycolate modified derivative, 4%—1000 parts
- carbizol violet dispersion—25 parts
- ammonium hydroxide, 20%—an amount sufficient to raise the pH of the coloring system to 7.0.

42. The pigment micro-agglomerate of claim 39, wherein the hydrophobic pigment particles are a burnt umber dispersion and a carbon black dispersion, wherein the base is ammonium hydroxide, and wherein the following constituents are in the following proportion by weight:
- glycolate modified derivative, 4%—1000 parts
- burnt umber dispersion—30 parts
- carbon black dispersion, 20%—3 parts
- ammonium hydroxide—an amount sufficient to raise the pH of the coloring system to 7.0.

* * * * *